United States Patent
Köppl et al.

[11] Patent Number: 5,990,035
[45] Date of Patent: Nov. 23, 1999

[54] POLYMERIZATION CATALYST SYSTEMS, THEIR PREPARATION, AND USE

[76] Inventors: Alexander Köppl, Bambergerstrasse 51, 95445; Helmut G. Alt, Wacholderweg 27, D-95445, both of Bayreuth, Germany; Syriac J. Palackal, 2501 Dorchester Dr.; M. Bruce Welch, 4750 Lewis Dr., both of Bartlesville, Okla. 74006

[21] Appl. No.: 08/955,219

[22] Filed: Oct. 21, 1997

[51] Int. Cl.$^6$ ............... B01D 31/00; B01J 37/00; C08F 4/02; C08F 4/60
[52] U.S. Cl. ............... 502/152; 502/151; 502/159; 502/111; 502/109
[58] Field of Search ............... 502/151, 152, 502/111, 159

[56] References Cited

U.S. PATENT DOCUMENTS

| | | | |
|---|---|---|---|
| 2,827,446 | 3/1958 | Breslow | 260/94.9 |
| 3,242,099 | 3/1966 | Manyik et al. | 252/429 |
| 4,431,788 | 2/1984 | Kaminsky | 527/313 |
| 4,544,762 | 10/1985 | Kaminsky et al. | 556/179 |
| 4,665,208 | 5/1987 | Welborn, Jr. et al. | 556/179 |
| 4,904,631 | 2/1990 | Chang | 502/120 |
| 4,912,075 | 3/1990 | Chang | 502/107 |
| 4,925,821 | 5/1990 | Chang | 502/107 |
| 4,937,217 | 6/1990 | Chang | 502/111 |
| 4,978,730 | 12/1990 | Maezawa et al. | 502/111 |
| 4,990,640 | 2/1991 | Tsutsui et al. | 556/181 |
| 5,006,500 | 4/1991 | Chang | 502/107 |
| 5,008,228 | 4/1991 | Chang | 502/111 |
| 5,049,535 | 9/1991 | Resconi et al. | 502/117 |
| 5,234,878 | 8/1993 | Tsutsui et al. | 502/103 |
| 5,340,786 | 8/1994 | Tsutsui et al. | 502/111 |
| 5,427,992 | 6/1995 | Graefe et al. | 502/152 |
| 5,446,001 | 8/1995 | Gurtzgen | 502/151 |
| 5,529,965 | 6/1996 | Chang | 502/110 |
| 5,534,474 | 7/1996 | Becker et al. | 502/152 |
| 5,595,950 | 1/1997 | Sagar et al. | 502/152 |
| 5,616,665 | 4/1997 | Jejelowo et al. | 526/129 |
| 5,670,589 | 9/1997 | Geerts et al. | 502/111 |
| 5,728,640 | 3/1998 | Lu et al. | 502/111 |
| 5,789,332 | 8/1998 | Kutschera et al. | 502/111 |

FOREIGN PATENT DOCUMENTS

| | | |
|---|---|---|
| 1247297 | 12/1988 | Canada . |
| 0 170 059 | 2/1986 | European Pat. Off. . |
| 208561 | 1/1987 | European Pat. Off. . |
| 0 308 177 | 3/1989 | European Pat. Off. . |
| 368644 | 5/1990 | European Pat. Off. . |
| 513808 | 11/1992 | European Pat. Off. . |
| 0 567 952 | 11/1993 | European Pat. Off. . |
| 3240382 | 5/1984 | Germany . |
| 61-31404 | 2/1986 | Japan . |

OTHER PUBLICATIONS

Journal of Molecular Catalysis, vol. 9 (1980), p. 423–434, D. Slotfeldt–Ellingsen et al.

Specification to Inventor's Certificate, U.S.S.R., published on Aug. 23, 1977.

Translation of Japanese Patent Application Publication (Kokai) 62–148491.

*Primary Examiner*—Mark L. Bell
*Assistant Examiner*—J. Pasterczyk
*Attorney, Agent, or Firm*—Edward L. Bowman

[57] ABSTRACT

A solid cocatalyst is prepared by combining (1) a first material capable of affixing an organoaluminum compound with (2) an organic liquid and then adding an organoaluminum compound and then contacting that product with water dispersed in an inert gas. Further catalyst compositions prepared from that cocatalyst and the use of such catalyst compositions to polymerize olefins is disclosed.

10 Claims, No Drawings

POLYMERIZATION CATALYST SYSTEMS, THEIR PREPARATION, AND USE

FIELD OF THE INVENTION

This invention relates to the polymerization of olefins. In another aspect this invention relates to transition metal based catalyst systems for the polymerization of olefins. The invention is particularly related to a method for preparing a solid cocatalyst suitable for producing solid transition metal catalyst systems.

BACKGROUND OF THE INVENTION

The discovery that metallocenes of transition metals can be used as catalysts for the polymerization of olefins has led to significant amounts of research since it was found that different metallocenes could produce different types of polymers. One of the earliest references to the use of metallocenes in the polymerization of olefins is U.S. Pat. No. 2,827,446 which discloses a homogeneous, i.e. liquid, catalyst system of bis(cyclopentadienyl) titanium dichloride and an alkyl aluminum compound. The activity of such systems was not, however, as high as would be desired. It was latter discovered that more active catalyst systems would result if the metallocene was employed with an alkylaluminoxane cocatalyst, such as that disclosed in U.S. Pat. No. 3,242,099. One drawback of such metallocene-based catalyst system is that they generally must be used with large amounts of alkylaluminoxane cocatalysts, which are significantly more expensive than the alkyl aluminum cocatalysts. There is therefore a need for cocatalysts that would be effective in smaller amounts.

Various techniques are known for producing alkylaluminoxane, the simplest being to add water in a controlled fashion to an alkylaluminum compound such as disclosed in the aforementioned U.S. Pat. No. 3,242,099. Other techniques for producing such aluminoxanes involve reacting alkylaluminum compounds with solids containing water. See, for example, EPC 208,561; USSR Inventor Certificate 566,844: JP 60/289223; and U.S. Pat. Nos. 4,544, 762; and 4,665,208.

For many commercial processes it is necessary to develop solid catalysts that are suitable for the particular type of commercial scale equipment employed. U.S. Pat. No. 4,431, 788 teaches that a catalyst system can be prepared by reacting a solid having labile hydrogen atoms, such as starch, with an aluminum alkyl and then combining that product with a metallocene. Similarly German patent 3,240, 382 teaches reacting alkyl aluminum compounds with solids containing water to produce solids coated with alkylaluminoxanes. Examples of other supported cocatalysts prepared by reacting organoaluminum compounds with solids containing water are disclosed in EPC 386,644; and U.S. Pat. Nos. 4,904,631; 4,912,075; 4,925,821; 5,006,500; 5,008, 228; and 5,529,965.

The presence of soluble aluminoxane or polymerization catalyst, even on solid catalyst systems, has also been found to often be detrimental in commercial slurry type polymerization processes, the thought being that when the aluminoxane and/or polymerization catalyst is present in a dissolved form it contributes to the formation of fouling in the polymerization reactors. Accordingly, merely depositing aluminoxane on a solid support has not been found to be a particularly beneficial technique for preparing a catalyst system for slurry type polymerization processes, as some remaining soluble species usually result in reactor fouling.

One object of the present invention is to provide a simplified method of preparing a solid cocatalyst that can readily be used to form a solid catalyst system that can be used in the polymerization of olefins. Another object is to provide a cocatalyst that is more cost effective than alkylaluminoxanes. Another object is to provide a new type of solid cocatalyst system particularly suitable for use with metallocenes. Another object is to provide solid transition metal containing catalyst systems suitable for polymerizing olefins. Still another object is to provide a process for polymerizing olefins, especially in slurry type polymerization.

SUMMARY OF THE INVENTION

In accordance with the present invention there is provided a method for polymerizing an olefin using a solid catalyst system. The catalyst system is prepared by combining an olefin polymerization catalyst with a solid cocatalyst. The solid cocatalyst is prepared by reacting a suitable support base with an organoaluminum compound and then reacting that product with an activity promoting amount of water.

DETAILED DESCRIPTION OF THE INVENTION

In accordance with the present invention an organoaluminum compound is reacted with a suitable support base or carrier in a liquid diluent and then with water to produce a new type of solid which can be used as a cocatalyst for transition metal olefin polymerization catalysts.

The terms "support base", "support", and "carrier" as used herein refer to the material that produces a solid when reacted with the organoaluminum compound and water. The support base thus does not have to actually be a solid. The term "base" in the phrase "support base" does not refer to the pH but just to the material which is the center upon which the solid cocatalyst is formed. It is contemplated that the support base can be any organic, organometallic, or inorganic compound capable of affixing the organoaluminum compound either through absorption, adsorption, Lewis Acid/Lewis Base interactions, or by reaction with hydroxyl groups of the support base.

A wide range of materials can be used as the support base. Generally, any material that will result in a solid cocatalyst that remains insoluble in the polymerization diluent during the polymerization process can be employed as the support base. Thus the support base includes materials that form solids when reacted with an organoaluminum compound and water as well as solids that are insoluble in the particular liquid diluent that is present during the polymerization. It is generally preferred that the support base be capable of yielding a particulate solid cocatalyst. The support base can be a material having surface groups which are known to react with organoaluminum compounds or a material which is free of surface groups which react with organoaluminum compounds. Some examples of materials envisioned for use as a support base include starch, lignin, cellulose, sugar, silica, alumina, silica-alumina, titania, zirconia, zeolites of silica and/or alumina, magnesia, calcium carbonate, aluminum trifluoride, boron oxide, magnesium dichloride, boric acid, activated carbon, carbon black, organoboranes, organoboroxines, $Si(OMe)_3Me$, hydrocarbyl polyalcohols, boric acid, alumina, polyethylene, polyethylene glycol, and the like. One embodiment comprises dissolving polyethylene in a suitable organic solvent then adding the organoaluminum compound and then adding the water to produce a solid cocatalyst. It is generally preferred that the support base that is reacted with the organoaluminum compound be relatively free of water, i.e. that it contain less than about 5 weight percent water, more preferably less than 1 weight percent water.

The term organoaluminum compound as used herein refers to compounds of the formula $R_nAlX_{3-n}$, wherein n is a number in the range of 1 to 3, each R is the same or different organo radical, preferably a hydrocarbyl radical, and each X is a halide. Typically the organo radicals would have 1 to 12 carbon atoms, more preferably 1 to 5 carbon atoms. Some examples of organoaluminum compounds include trialkylaluminum compounds, triarylaluminum compounds, dialkylaluminum hydrides, diarylaluminum hydrides, aryl alkyl aluminum hydrides, dialkylaluminum halides, alkyl aluminum dihalides, alkyl aluminum sesquihalides, and the like. Some specific examples of such organoaluminum compounds include trimethylaluminum, triethylaluminum, dimethylaluminum chloride, triisopropylaluminum, triisobutylaluminum, trihexylaluminum, diethylaluminum chloride, ethyl aluminum dichloride, ethyl aluminum sesquichloride, dimethyl aluminum chloride, and the like. The currently preferred organoaluminum compounds are the alkyl aluminum compounds, especially the trialkyl aluminum compounds. It is also within the scope of the present invention to mixtures of such organoaluminum compounds.

The organoaluminum compound is contacted with the support in a suitable organic liquid diluent. Preferably the organic liquid diluent is anhydrous, i.e. substantially free of water. Examples of what is meant by organic liquid include hydrocarbons such heptane, octane, decane, dodecane, kerosene, cyclopentane, cyclohexane, methylcyclopentane, benzene, toluene, and xylene as well as halogenated compounds such as chlorobenzene and the like, as well as mixtures thereof. It is within the scope of the invention to simply admix the support and a liquid diluent solution of the organoaluminum compound. Another option is to add a solution of the organoaluminum compound to a slurry of the support base in a liquid diluent.

The amount of liquid diluent employed can vary over a wide range. Typically the amount of liquid, including liquid accompanying the added organoaluminum compound, would be in the range of about 0.1 to about 5000 ml/gram of support or more often about 5 to about 200 ml/gram of support. The amount of the organoaluminum compound relative to the support base can vary over a wide range depending upon the particular material selected as the support base and the particular results desired. The amount necessary to provide the greatest yield of the most active cocatalyst for a specific support and a specific organoaluminum compound can be readily determined by routine experimentation. A typical range for the amount of the organoaluminum compound would be from about 0.001 moles/gram of support base to about 1 mole/gram of support base.

The temperature at which the organoaluminum compound and the support base are contacted can vary over a wide range. Typically it would be carried out at a temperature in the range of about −50° C. to about the boiling point of the liquid diluent, generally in the range of about −50° C. to about 200° C. It is currently preferred to carry out the contacting at a temperature in the range of about 10 to about 100° C. Higher temperatures can speed up the process for producing the solid cocatalyst. Higher pressures can allow for the use of higher temperatures.

After the contacting of the support base with the organoaluminum compound is complete the resulting solution or slurry is contacted with water. This is the most critical step of producing the solid cocatalyst. The water can be introduced in any convenient manner. For example, a slurry of water in a hydrocarbon can be added or water can just be added directly to the slurry. Other options would include adding ice or adding a solid containing water. Preferably, for safety reasons the water is added slowly while the slurry is agitated as by stirring. It is currently preferred to introduce the water into the slurry as a gas, preferably in an inert carrier gas such as nitrogen or argon. The introduction of the water via an inert carrier gas has been found to result in a more uniform distribution of the cocatalyst components on the surface of the support base. The temperature employed during the water addition can vary over a wide range depending upon the technique being employed but is typically in the range of about −100° C. to about 100° C. In a preferred embodiment, in which the water is added to the slurry via an inert gas, the gas is passed through a heated vessel containing water and is then passed into the vessel containing the slurry, which is also preferably heated.

The amount of water necessary to improve the activity of the resulting cocatalyst can vary. That amount is referred to herein as an activity promoting amount. The amount necessary to obtain an improvement in activity can vary depending upon the particular support selected, the amount of organoaluminum compound employed, and the amount of groups on that support which will react with the organoaluminum compound. The optimum amount of water to be added for a particular support can be readily determined by routine experimentation. Generally the water will be employed in an amount such that the molar ratio of added water to the aluminum of the organoaluminum compound will be in the range of about 0.1/1 to about 3/1, more preferably the range for the molar ratio of the water to the aluminum of the organoaluminum compound is in the range of about 0.2/1 to about 1.5/1, or even still more preferably about 0.5/1 to about 1.2. The reaction time can range from a few minutes to several hours and can often be monitored by observing the temperature and/or the evolution of gases.

After the reaction with the water has been completed the resulting product can be used as a cocatalyst for olefin polymerization catalysts of the type that are activated by organoaluminum compounds. Examples of such olefin polymerization catalysts include a wide range of the transition metal catalysts, including the transition metal coordination catalysts often referred to as Ziegler/Natta catalysts. Thus included are catalysts that benefit from the use of organoaluminum compounds. Also included are the metallocene catalysts. Some typical examples of the transition metal coordination catalysts include titanium tetrachloride, titanium tetraethoxide, vanadium dichloride, vanadium trichloride, vanadium tetrachloride, titanium trichloride, zirconium tetrachloride, niobium pentachloride, tantalum pentachloride, chromic chloride, vanadyl acetylacetonate, chromium acetylacetonate, and the like. Other examples of olefin polymerization catalysts include transition metal complexes of bidentate ligands such as disclosed in WO 96/23010, the dislosure of which is incorporated by reference, especially the nickel and palladium complexes.

The term metallocene catalyst as used herein includes to organometallic compounds of the formula:

$$(L)_mM(A)_n$$

wherein each L is a bulky organo ligand, each A is a replaceable group, M is a transition metal selected from Groups 3–6 and 8–10 of the Periodic Table including the lanthanide and actinide metals, and m and n are integers such that the total ligand valency corresponds to the valence of M. The ligands L and A may be bridged to each other, and if two L and/or A ligands are present they may also be bridged. The metallocene compound may be full-sandwich bonded having two or more ligands each having a cyclopentadienyl structure or half-sandwich compounds having only one ligand having a cyclopentadienyl structure. Preferably at least one ligand L has a multiplicity of bonded atoms, preferably carbon atoms, and a cyclic structure such as a cyclopentadienyl ligand or any other ligand capable of eta-5 bonding to M. Examples of typical removable groups A include halides such as chloride, hydrocarbyls such as phenyl or alkyl, or other univalent anionic ligands. The term metallocene as used herein thus includes the catalysts of the type disclosed in U.S. Pat. No. 5,055,438, the disclosure of which is incorporated by reference. A currently preferred type of metallocene is a bridged sandwich bonded metallocene having polymerizable substituents such as those covered by the claims of U.S. Pat. No. 5,565,592 which is incorporated herein by reference.

Olefin polymerization catalyst systems can be prepared by simply adding an olefin polymerization catalyst to the slurry resulting from the production of the cocatalyst, or the solids of the slurry can be filtered and optionally washed and then combined with the polymerization catalyst, or the liquid of the slurry can be evaporated and the resulting solids then combined with the polymerization catalyst to form the solid catalyst system. Typically, the polymerization catalyst is combined with the solid cocatalyst in a liquid diluent, preferably a liquid diluent in which the catalyst is soluble. The resulting catalyst system can be used directly or it can be separated from the liquid and then used as a solid catalyst system for a later polymerization. Such a recovered solid catalyst system can be washed with a hydrocarbon, preferably an aliphatic hydrocarbon, and dried, preferably under a high vacuum. Currently, however, it is preferred to separate the solid from the liquid and then dry it under a high vacuum without any secondary washing.

The amount of the polymerization catalyst that is combined with the inventive cocatalyst can vary over a wide range depending upon the particular catalyst and cocatalyst selected and the particular results desired. Typically the polymerization catalyst is employed in such an amount that the atomic ratio of the Al of the cocatalyst to the metal of the polymerization catalyst is in the range of about 1/1 to about 10000/1, more preferably about 10/1 to 1000/1.

The temperature at which the polymerization catalyst and the inventive cocatalyst are combined is not considered to be particularly critical. Typically this is done at temperatures in the range of about −50° C. to about 300° C., or more preferably about 0° C. to about 100° C., or still more preferably about 10° C. to about 80° C. Typically the catalyst system can be employed shortly after the inventive cocatalyst and the polymerization catalyst are brought together.

It is also within the scope of the invention to subject any of the forms of the catalyst system to reaction with an olefin to form a prepolymerized version of the catalyst system. Such prepolymerizations can be conducted using olefins such as those normally polymerized by the polymerization catalysts. The currently preferred olefin being ethylene either alone or in combination with alpha olefins such as propylene, butene, 1-hexene, 4-methyl-1-pentene, and the like. It is currently preferred that the metallocene have at least one polymerizable substituent. The prepolymerizations can be conducted under a wide range of conditions, typically it is preferred to conduct the prepolymerization in a liquid diluent at temperatures in the range of about −15° C. to about 200° C., more typically about 0° C. to about 100° C. The amount of prepolymerization conducted can vary; however, typically would be such that the prepolymer would be in the range of from about 1 to about 95 weight percent of the resulting prepolymerized catalyst system, more preferably about 5 to 80 weight percent.

In a currently preferred embodiment a prepolymerized catalyst system is prepared by reacting the support with the organometallic compound in a liquid diluent, then adding the water to that slurry, then after the reaction is substantially complete adding the metallocene to the slurry, then the slurry is contacted with an olefin under prepolymerization conditions to produce a prepolymerized solid catalyst system which can be used as is in the slurry or separated from the liquid and dried for subsequent use in a polymerization. While the dried catalyst system can be subjected to washing with a hydrocarbon before being used in a subsequent polymerization, it has been noted that more active catalyst systems in terms of grams of polymer per gram of transition metal result if there is no such washing step.

It is contemplated that the catalyst systems of the present invention can be employed in generally any type of polymerization where similar catalysts have been employed in the past. The catalysts are considered to be particularly well suited for slurry type polymerization processes. The conditions employed when using the catalyst systems of the present invention can be the same as those used with prior art systems. Typically when the polymerization is carried out in the presence of a liquid the polymerization will be conducted at a temperature in the range of about −50° C. to about 300° C. and the pressure will be from about normal atmospheric pressure to about 2000 kg/cm$^3$. In some cases it may be desirable to add some additional organoaluminum compound to the polymerization vessel, such as triethyl aluminum or triisobutylaluminum as a poison scavenger.

A further understanding of the present invention, its objects, and advantages will be provided by the following examples.

EXAMPLE I
Inventive Cocatalyst Using Flour as a Support Base

Two grams of flour was combined with 30 mL of a 15 wt. % solution of trimethylaluminum in toluene. The mixture was stirred for 4 hrs. at 80° C. and then 25 additional mL of toluene was added. The resulting slurry was cooled to −78° C. and 0.75 mL of water was added. Stirring was continued for 4 hrs. The resulting suspension was then filtered, and washed first with toluene and then with pentane and then dried. The yield was 4.68 g of a white powder.

A polymerization was conducted by suspending 0.27 g of the above-mentioned white powder in 50 mL of toluene and then adding 0.001 mmol bis(cyclopentadienyl) zirconium dichloride. This suspension was stirred for 30 minutes and then ethylene was added at 5 bar pressure. After 3 minutes methanol was added. The resulting mixture was then filtered, washed with methanol, and dried in a high vacuum. The polymerization produced 2.4 g of white polymer fluff.

EXAMPLE II (Comparative)
Preparation of Solid Cocatalyst With Water Added Before Aluminum Organoaluminum Compound In this example, 0.75 ml of water was admixed with 25 mL of toluene and then combined with 2 g of flour. The suspension was cooled to −78 ° C. and 30 mL of a 15 wt. % solution of trimethylaluminum in toluene was slowly added. The mixture was slowly warmed to room temperature over about 1 hr. and then heated to 80° C. for 4 hrs. The resulting suspension was filtered, and washed first with toluene and then with pentane and then dried. The yield was 3.3 g of a slightly yellow powder.

A polymerization was conducted by suspending 0.27 g of the slightly yellow powder in 50 mL of toluene and then adding 0.001 mmol bis(cyclopentadienyl) zirconium dichloride. The resulting suspension was stirred for 30 minutes; then ethylene was added at 5 bar pressure. After 3 minutes methanol was added. The resulting mixture was then filtered, washed with methanol, and dried in a high vacuum. The result was 1.55 g of a white polymer fluff.

Comparing the results of Examples I and II reveals that by adding water after the addition of the organoaluminum compound there is a higher yield of the solid cocatalyst and the resulting solid cocatalyst is much more active than the solid cocatalyst produced by adding water before the addition of the organoaluminum compound. It was observed that when one first reacts the trimethylaluminum with the flour and then with water about 80% of the trimethylaluminum on the flour is affixed to the solid. In contrast, when one reacts the flour with water and then with the trimethylaluminum only about 40% of the trimethylaluminum is affixed to the flour. The rest is washed out as a soluble organoaluminum compound.

EXAMPLE III

A series of runs were conducted to evaluate the effect of the amount of water employed when silica is used as the cocatalyst support base. The typical inventive procedure involved slurrying in toluene 2 g of silica having less than 1 weight percent water and then adding 20 mL of a 2 molar toluene solution of trimethylaluminum at room temperature. The resulting slurry was then heated to 50° C. and various amounts of water were added via a wet argon stream. After 30 minutes, the reaction mixture was allowed to cool to room temperature and then stirred for another 2 hrs. Then 0.11 g of the metallocene 5-cyclopentadienyl-5-(9-fluorenyl) 1-hexene zirconium dichloride was added to the slurry and stirred for 5 minutes. The resulting slurry was then filtered, washed twice with 25 mL of pentane, and dried in a high vacuum. In one control run no water was added. The resulting catalyst systems were then evaluated in the polymerization of ethylene in a 1 liter reactor containing 200 mL of pentane. As a poison scavenger, 1 mL of a 1.6 hexane solution of triisobutylaluminum was employed. The polymerizations were conducted at 70° C., 10 bar ethylene pressure, for 60 minutes each. The results are summarized in the following table.

TABLE 1

| Run Number | Molar Ratio Added $H_2O/TMA$ | Catalyst Yield [g] | Productivity [gPE/gZrh] |
|---|---|---|---|
| 1 | 0 | 2.09 | 0 |
| 2 | 0.37 | 3.52 | 10,000 |
| 3 | 0.55 | 4.10 | 49,000 |
| 4 | 0.65 | 5.61 | 140,000 |
| 5 | 0.69 | 5.54 | 288,000 |
| 6 | 0.74 | 5.62 | 228,000 |
| 7 | 0.83 | 5.60 | 154,000 |
| 8 | 0.93 | 5.51 | 32,000 |
| 9 | 1.11 | 5.64 | 0 |

The results demonstrate that the addition of water improves the productivity of the catalyst system. Optimum molar ratios of water to aluminum were in the range of 0.65 to 0.83 moles of water per gram atom of aluminum. No fouling of the reactor occurred with the inventive catalyst systems

EXAMPLE IV

A series of catalyst systems were also prepared using an inventive cocatalyst prepared in the manner described in Example III with a water to aluminum ratio of 0.74. Then that cocatalyst was combined with different amounts of the metallocene used in Example III. The resulting catalyst systems were then evaluated for the polymerization of ethylene. The results are set forth in the following table.

TABLE 2

| Run Number | Molar Ratio Added $H_2O/TMA$ | Al:Zr Molar Ratio | Productivity [gPE/gZrh] |
|---|---|---|---|
| 10 | 0.74 | 70 | 71,000 |
| 11 | 0.74 | 140 | 86,700 |
| 12 | 0.74 | 260 | 228,000 |
| 13 | 0.74 | 470 | 114,000 |
| 14 | 0.74 | 810 | 33,000 |

The table demonstrates that optimum activities per amount of zirconium used are obtained for that catalyst system at an aluminum to zirconium ratio of about 260/1. For the aluminum to zirconium ratio and the polymerization conditions employed these are unusually high productivities as compared to catalyst systems using normal aluminoxane. Higher zirconium ratios can be used to maximize productivity based on the total grams of solid catalyst system rather than on the total grams of zirconium.

EXAMPLE V

A catalyst system was prepared by adding 30 ml of a 2 molar solution of trimethylaluminum in toluene to 2 grams of dried silica. The mixture was stirred for 15 minutes at 50° C. Then 100 ml of toluene was added and 0.5 ml of water was introduced via an argon stream. When the addition of the water was complete, the slurry was stirred for 2 hours. Then 0.110 grams of 5-(cyclopentadienyl)5-(9-fluorenyl)-1 hexene zirconium dichloride was added and the slurry stirred for another 5 minutes. Then, at room temperature, ethylene was introduced at 1 bar to start the prepolymerization reaction. After fifteen minutes, the slurry was filtered, washed twice with 25 ml of pentane, and dried in a high vacuum. The yield was 6.65 grams of a dark pink solid.

This resulting solid prepolymerized catalyst system was then evaluated for the polymerization of ethylene. The polymerization was conducted in a 1 liter reactor containing 500 ml of pentane. To the pentane was added 1 ml of a 1.6 molar hexane solution of triisobutylaluminum. The polymerization was conducted at 10 bar pressure and 70° C. for one hour in the presence of the solid prepolymerized catalyst system. The polymerization demonstrated a productivity of 453,000 rams of polyethylene per gram of zirconium per hour.

EXAMPLE VI

A solid prepolymerized catalyst system was prepared by combining two grams of dried silica with 30 ml of a 2 molar toluene solution of trimethylaluminum. The mixture was stirred for 15 minutes at 50° C. then 100 ml of toluene was added and 0.75 ml was introduced via an argon stream. When the addition of the water was complete, the slurry was stirred for 2 hours. Then 0.110 grams of the metallocene used in Example V was added and the slurry stirred for another 5 minutes. Then ethylene was introduced for 10 minutes at 1 bar pressure. The resulting dark pink slurry was filtered and dried in a high vacuum for two hours. In contrast to the procedure in Example VI in this case there was no washing with pentene between the filtering and the drying.

The resulting prepolymerized catalyst was then evaluated in the polymerization of ethylene using the same conditions as used in Example V. The evaluation resulted in a productivity of 810,000 grams polyethylene per gram of zirconium per hour. A comparison of the results of Examples V and VI reveals that in terms of productivity per gram of zirconium, better results are obtained if there is no washing of the solid before it is dried. A similar observation was made even when the catalyst system was not subjected to prepolymerization. Specifically, it was noted that the productivity in terms of grams of polyethylene per gram of zirconium was superior when there was no washing with pentane between the filtration and the drying step.

EXAMPLE VII (Comparative)

An attempt was made to prepare a solid catalyst system without the use of a support base. The preparation involved combining 30 ml of a 2 molar toluene solution of TMA and 100 ml of toluene and heating to 50° C. Then 0.75 ml of water was added via argon purging through the clear solution. After the water addition was completed, the clear solution was cooled to room temperature and stirred for 2 hours. The solvent was then removed at 40° C. under a high vacuum to yield 1.95 grams of a white, glassy solid. This solid aluminoxane was then evaluated for the polymerization of ethylene. The polymerization involved adding 50 milligrams of the metallocene of Example V and 1.6 grams of the solid methylaluminoxane to 10 ml of toluene and stirring for 30 minutes. Then 0.5 milliliter of the resulting dark pink solution and 1 ml of a 1.6 molar solution of triisobutylaluminum and heptane was added to 500 ml of pentane. The resulting slurry was then used for the polymerization of ethylene at 10 bar of ethylene pressure and a 500 ml of pentane in a 1 liter reactor at 70° C. The productivity of the catalyst was 242,000 grams of polyethylene per gram of zirconium per hour. Significant amounts of fouling were noticed in contrast to the runs carried out in Examples V and VI where no fouling was noted.

EXAMPLE VIII

A solid cocatalyst was prepared by reacting 0.5 grams of 1,6-hexanediol in toluene with 30 ml of a 2 molar toluene solution of trimethylaluminum for 60 minutes at 50° C. To the resulting slurry was added 0.6 ml of water via a wet argon stream. After 30 minutes, the reaction mixture was allowed to cool to room temperature and was then stirred for another 2 hours. Then 0.11 grams of the metallocene of Example V was added and the mixture stirred for 5 minutes. The slurry was then filtered, washed twice with 25 ml of pentane, and dried in a high vacuum. The yield was 3.82 grams of the solid catalyst system.

This solid catalyst system was then evaluated in the polymerization of ethylene using a 1 liter reactor containing 500 ml of pentane and 1 ml of a 1.6 molar hexane solution of triisobutylaluminum. The polymerization was conducted at 70° C. under 10 bar ethylene pressure for 1 hour. This catalyst had a productivity of 110,000 grams of polyethylene per gram of zirconium per hour.

That which is claimed is:

1. A process for producing a solid suitable for use as a cocatalyst for a transition metal containing olefin polymerization catalyst comprising:

(a) contacting a first material with an organoaluminum compound and an organic liquid diluent, said first material containing no more than 1 weight percent water and being selected from the group consisting of starch, flour, cellulose, silica, alumina, aluminum trifluoride, boron oxide, polyethylene, 1,5-hexanediol, and silica alumina zeolites, and (b) passing water into the reaction mixture resulting from step (a) in the form of water dispersed in an inert gas to produce said solid.

2. A solid cocatalyst resulting from the process of claim 1.

3. A process according to claim 1 wherein the water is employed in an amount such that the molar ratio of the water to the aluminum of the organoaluminum compound is in the range of 0.1/1 to 3/1.

4. A process according to claim 1 wherein said organoaluminum compound is a trialkylaluminum.

5. A process according to claim 1 wherein said organoaluminum compound is trimethylaluminum.

6. A solid cocatalyst resulting from the process of claim 5.

7. A process according to claim 5 wherein said first material is silica having no more than 1 weight percent water.

8. A process according to claim 5 wherein said first material is starch having no more than 1 weight percent water.

9. A solid cocatalyst resulting from the process of claim 8.

10. A solid cocatalyst resulting from the process of claim 7.

* * * * *